United States Patent
Benteo et al.

(10) Patent No.: US 8,532,295 B2
(45) Date of Patent: Sep. 10, 2013

(54) METHOD FOR THE SECURE LOADING IN A NFC CHIPSET OF DATA ALLOWING ACCESS TO A SERVICE

(75) Inventors: Bruno Benteo, Toulouse (FR); Bruno Charrat, Aix en Provence (FR); Philippe Martineau, Fuveau (FR)

(73) Assignee: Inside Secure, Aix-en-Provence Cedex (FR)

( * ) Notice: Subject to any disclaimer, the term of this patent is extended or adjusted under 35 U.S.C. 154(b) by 1399 days.

(21) Appl. No.: 11/952,893

(22) Filed: Dec. 7, 2007

(65) Prior Publication Data

US 2008/0219444 A1 Sep. 11, 2008

(30) Foreign Application Priority Data

Mar. 7, 2007 (FR) ...................................... 07 01670
Oct. 26, 2007 (FR) ...................................... 07 07528

(51) Int. Cl.
*H04K 1/00* (2006.01)

(52) U.S. Cl.
USPC ........................................................ 380/255

(58) Field of Classification Search
USPC ............. 380/258, 270, 30, 44, 255, 281, 282, 380/286, 259; 455/41
See application file for complete search history.

(56) References Cited

U.S. PATENT DOCUMENTS

| | | | |
|---|---|---|---|
| 5,564,106 A * | 10/1996 | Puhl et al. ...................... | 380/286 |
| 5,666,420 A * | 9/1997 | Micali .............................. | 380/30 |
| 6,490,680 B1 | 12/2002 | Scheidt et al. | |
| 7,142,676 B1 | 11/2006 | Hillier et al. | |
| 7,142,678 B2 * | 11/2006 | Falcon .......................... | 381/107 |
| 7,305,093 B2 * | 12/2007 | Harrison et al. .............. | 380/282 |
| 7,590,246 B2 * | 9/2009 | Calmels et al. ............... | 380/270 |
| 2007/0106879 A1 * | 5/2007 | Tanaka .......................... | 712/214 |
| 2010/0045425 A1 * | 2/2010 | Chivallier ..................... | 340/5.8 |

FOREIGN PATENT DOCUMENTS

| | | | |
|---|---|---|---|
| CA | WO2006122433 | * | 11/2006 |
| WO | 2006003558 A2 | | 1/2006 |
| WO | 2006/122433 A | | 11/2006 |

OTHER PUBLICATIONS

Menezes, A., et al.: Handbook of Applied Cryptography. CRC Press LLC, USA, Jan. 1, 1997, pp. 546-550.

* cited by examiner

*Primary Examiner* — Beemnet Dada
(74) *Attorney, Agent, or Firm* — Panitch Schwarze Belisario & Nadel LLP

(57) ABSTRACT

A method for the secured loading of data into a first secured host processor of an NFC system comprising an NFC interface circuit for sending and receiving data, enabling a service to be accessed, the method comprising: generating a secret data, transmitting the secret data to the first host processor through a secured link, ciphering data to be loaded into the first host processor using a public key of the first host processor, and transmitting the ciphered data to the system for the first host processor which deciphers the data using a private key corresponding to the public key.

18 Claims, 7 Drawing Sheets

METHOD FOR THE SECURE LOADING IN A NFC CHIPSET OF DATA ALLOWING ACCESS TO A SERVICE

BACKGROUND OF THE INVENTION

The present invention relates to a method for loading data and/or a secured application in an NFC (Near Field Communication) system or chipset comprising an NFC interface circuit.

NFC technology is currently developed by an industrial consortium grouped under the name Forum NFC (http://www.nfc-forum.org). NFC technology is derived from RFID (Radio Frequency Identification) technology and uses NFC components having several operating modes, i.e. a "Reader" Mode, a "card emulation" mode, and a "device" mode (also referred to as "device-to-device" mode). In the "reader" mode, the NFC component operates like a conventional RFID reader to read- or write-access an RFID chip (chip card or contactless tag). It emits a magnetic field, sends data by modulating the amplitude of the magnetic field and receives data by load modulation and inductive coupling. In the "emulation" mode, described by the patent EP 1 327 222 in the name of the applicant, the NFC component operates passively like a transponder to dialogue with another reader and to be seen by the other reader as an RFID chip. The component does not emit any magnetic field, receives data by demodulating a magnetic field emitted by the other reader and sends data by modulating the impedance of its antenna circuit (load modulation). In the "device" mode, the component must pair with another NFC component that is in the same operating mode, and each NFC component in turn goes into a passive state (without field emission) for receiving data and into an active state (with field emission) for sending data.

In addition to these three operating modes (other operating modes could be designed in the future), an NFC component can implement several contactless communication protocols and is for example capable of exchanging data according to the ISO 14443-A protocol, the ISO 14443-B protocol, the ISO 15693 protocol, etc. Each protocol defines a frequency of emission of the magnetic field, a modulation method for modulating the amplitude of the magnetic field to send data in active mode, and a load modulation by inductive coupling method to send data in passive mode. Therefore, an NFC component is a multimode and multi-protocol device. The applicant markets for example an NFC component under the name "MicroRead".

Due to its extended communication capacities, an NFC component is intended to be integrated into portable devices such as cellular telephones or PDAs (Personal Digital Assistant). As a result, an NFC chipset of the type represented in FIG. 1 is produced, i.e. a chipset comprising an NFC component (referenced "NFCR1") and at least one first host processor HP1. "Host processor" means any integrated circuit comprising a microprocessor or a microcontroller and which is connected to a port of the NFC component. In many applications, the NFC chipset also comprises a second host processor HP2, and sometimes a third HP3.

The first host processor HP1 is the main processor of the device into which the NFC component is embedded, while the second host processor HP2 is a secure circuit. The host processor HP1 is generally a non-secured processor, for example the baseband circuit (or radiotelephone circuit) of a mobile telephone. The host processor HP2 is for example a SIM card (i.e. the microcontroller present in a SIM card). Other host processors can be provided particularly for applications providing services other than communication services, such as banking services enabling the NFC chipset to be used as a means of payment.

Therefore, the resources of the NFC component are made available to the processors HP1, HP2 to enable them to manage contactless applications. Such applications are shown in FIG. 2 that represents a mobile telephone 30 equipped with the NFC chipset in FIG. 1. The following can be distinguished:

1) applications of AP1 type: the NFC component of the mobile telephone 30 is in reader mode to read or write a contactless integrated circuit CLCT. The mobile telephone is in this case used like an RFID reader. This type of application can be free of charge and consist for example in reading advertising data inserted into an advertisement of a bus shelter. The application can also be payable and consist for example in reading information reserved for subscribers. The program of the application AP1 is preferably held and executed by the processor HP1 if the service is free of charge or will preferably be held and executed by the processor HP2 if it is payable as it requires an identification of the subscriber. Thus, as shown in FIG. 1, an application AP1 can be processed by the processor HP1 or the processor HP2.

2) applications of AP2 type: the NFC component of the telephone 30 is in card emulation mode to be read by conventional RD readers in payment or payable access control applications (payment machine, entrance to the subway, etc.). The mobile telephone 30 is then used like a chip card. The program of the application AP2 is preferably held and executed by the secure processor HP2, as represented in FIG. 1, as the access to the service requires an identification of the subscriber.

3) applications of AP3 type: the NFC component of the telephone 30 is in "device" mode and dialogues with another device, for example a reader embedded into another mobile telephone 31 or a computer 32. This type of application is generally free of charge and enables data packets to be transferred from one device to another (particularly point-to-point file transfer). The program of the application AP3 is preferably held and executed by the non-secure processor HP1, as shown in FIG. 1, which has a computing power greater than the secure processor HP2 if the latter is a SIM card processor.

FIG. 3 schematically represents the architecture of an NFC component. The component comprises an interface circuit CLINT for contactless data sending/receiving, equipped with an antenna circuit ACT, the hard-wired communication interfaces INT1, INT2, INT3 connected to the interface circuit CLINT, and a controller NFCC. The interface INT1 is connected to the host processor HP1, the interface INT2 is connected to the host processor HP2, and the interface INT3 is connected to the host processor HP3. All these components form an NFC chipset.

In the AP2-type applications, it is however necessary to be able to identify the chipset and/or its owner with a high level of security. Now, one of the host processors (for example HP2), i.e. the SIM card of the mobile telephone, enables the user to be identified with the mobile telephony operator with a high level of security. For this purpose, the SIM card is supplied and customized by the operator. Therefore, it is difficult to envisage introducing into the SIM card other data or applications enabling the implementation of services provided by other entities, such as banks or transport service providers for example. It is therefore necessary to provide another secured host processor in the chipset. Providing a second detachable SIM-type card customized by the service provider has disadvantages in terms of space requirement and current consumption. Furthermore, if the user wishes to access services other than those offered by the service provider having supplied the SIM card, it is difficult to envisage using the same SIM card as the application needed to implement the service will be difficult to certify. The user will therefore have to obtain another card and change the card inserted into the chipset each time he/she wishes to access other services. Providing a non-detachable secured host processor in an NFC chipset also raises difficulties as to the procedure of customizing the host processor needed to establish secured communications between the host processor and the external environment of the chipset, either through a mobile telecommunication network, or through the contactless link offered by the NFC component.

It is thus desirable to enable a chipset to access services provided by different entities with a level of security equivalent to that offered by a SIM card.

Thus, in one embodiment, a method is provided for securely loading data into a first secured host processor of an NFC system comprising an NFC interface circuit for sending and receiving data, to access a service.

According one embodiment, the method comprises steps of: generating a secret data, transmitting the secret data to the first host processor through a secured link, ciphering data to be loaded into the first host processor using a public key of the first host processor, and transmitting the ciphered data to the NFC system for the first host processor which deciphers the data using a private key corresponding to the public key of the first host processor.

According to one embodiment, the method comprises steps of ciphering data to be loaded into the first host processor using the secret data, before being transmitted to the host processor, and deciphering the ciphered data by the host processor, using the secret data.

According to one embodiment, the method comprises prior steps of authenticating the NFC system and the operator generating the secret data.

According to one embodiment, the authentication of the NFC system and of the operator is performed by a service provider supplying the data to be loaded into the host processor, by checking certificates with a trusted certificate authority.

According to one embodiment, the method comprises a prior step of determining the recipient NFC system of the secret data from the identity of a user of the NFC system.

According to one embodiment, the secret data is transmitted in signed form by the operator having generated the secret data, and the signature is checked by a service provider supplying the data to be loaded into the first host processor.

According to one embodiment, the data to be loaded are transmitted in ciphered form to the NFC system through a mobile telephone network, and through a basic mobile telephone circuit.

According to one embodiment, the data to be loaded are transmitted in ciphered form to the NFC system through a contactless-reading integrated circuit card communicating with the NFC interface circuit.

According to one embodiment, the secured link between the operator and the host processor is produced through a second secured host processor of the NFC system.

According to one embodiment, the establishment of the secured communication link between the first host processor and the operator comprises steps of: authenticating the NFC system by a trusted certificate authority, generating a session key, ciphering the session key using a public key of the first host processor, transmitting the ciphered session key to the first host processor, and deciphering the session key by the first host processor using a private key corresponding to the public key of the first host processor, the session key then being used to cipher data transmitted between the first host processor and the operator.

According to one embodiment, the session key is generated by a second secured host processor of the NFC system.

According to one embodiment, the method comprises initial steps of the first host processor receiving a certificate of authenticity, a secured communication link being established with the operator after the certificate of authenticity has been checked and only if the certificate is valid.

According to one embodiment, the method comprises steps of exchanging secret data between a controller connected to the NFC interface circuit, the first host processor and a third non-secured host processor of the NFC system, a communication link between the controller, and the first and third host processors being established only after the secret data have been checked and only if the checking reveals no errors.

According to one embodiment, the method comprises initial steps of transmitting to the first host processor a unique identifier associated with a certificate of authenticity, which are stored by the first host processor.

According to one embodiment, the method comprises steps of checking that the secret data received by the host processor corresponds to the secret data generated, the ciphered data being not transmitted if the checking reveals an error.

According to another embodiment, there is provided an NFC system comprising a first secured host processor connected to an NFC interface circuit sending and receiving data, to access a service.

According to one embodiment, the first host processor is configured to: receive a secret data in a secured manner, receive ciphered data, and decipher the data received using a private key corresponding to the public key of the first host processor.

According to one embodiment, the host processor is configured to decipher the data received using the secret data.

According to one embodiment, the system comprises a basic mobile telephone circuit configured to receive in ciphered form the data to be loaded and transmit them to the first host processor.

According to one embodiment, the NFC interface is configured to receive the data to be loaded in ciphered form, transmitted by a contactless-reading integrated circuit card, and transmit them to the host processor.

According to one embodiment, the system comprises a second secured host processor capable of being connected in a secured manner to the operator, and configured to generate a session key, cipher the session key using a public key of the first host processor, and transmit the ciphered session key to the first host processor, the first host processor being configured to decipher the session key using a private key corresponding to the public key of the first host processor, the session key then being used to cipher data transmitted between the first and the second host processor.

According to one embodiment, the system comprises a controller connected to the NFC interface circuit, and the first host processor, the controller and a third non-secured host processor are configured to exchange secret data, a communication link between the controller, the first and the third host processor being established only after the secret data have been checked and only if the checking reveals no errors.

According to one embodiment, the host processor is configured to receive and store during a customization phase a unique identifier of the NFC system associated with a certificate of authenticity.

According to another embodiment, a mobile telephone is provided comprising an NFC system as defined above.

BRIEF DESCRIPTION OF THE SEVERAL VIEWS OF THE DRAWINGS

These and other objects, features and advantages of the present invention shall be presented in greater detail in the following description of an embodiment of the present invention, given in relation with, but not limited to the following figures, in which.

DETAILED DESCRIPTION OF THE INVENTION

Figure 1:
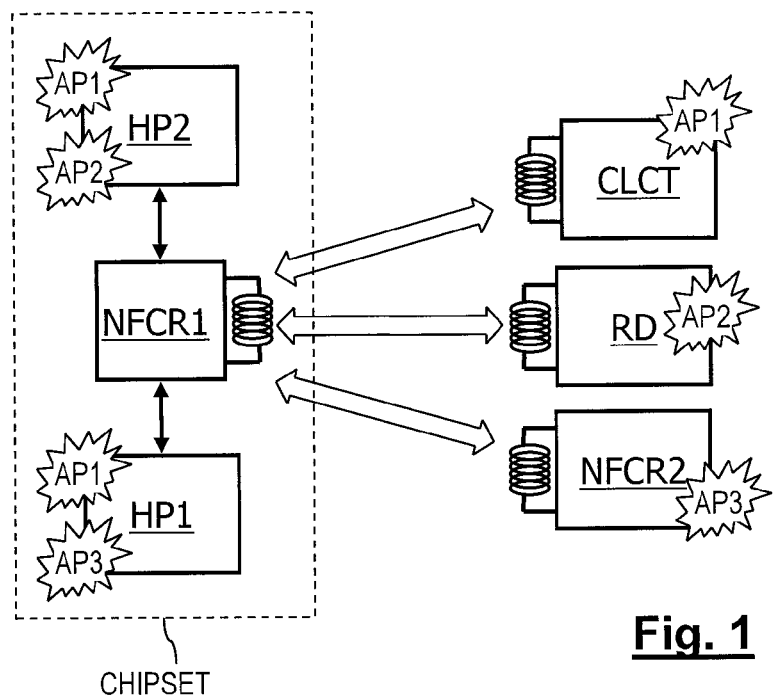
FIG. 1 described above represents in block form a classic NFC chipset architecture, and contactless circuits with which the NFC chipset can dialogue.
Figure 2:
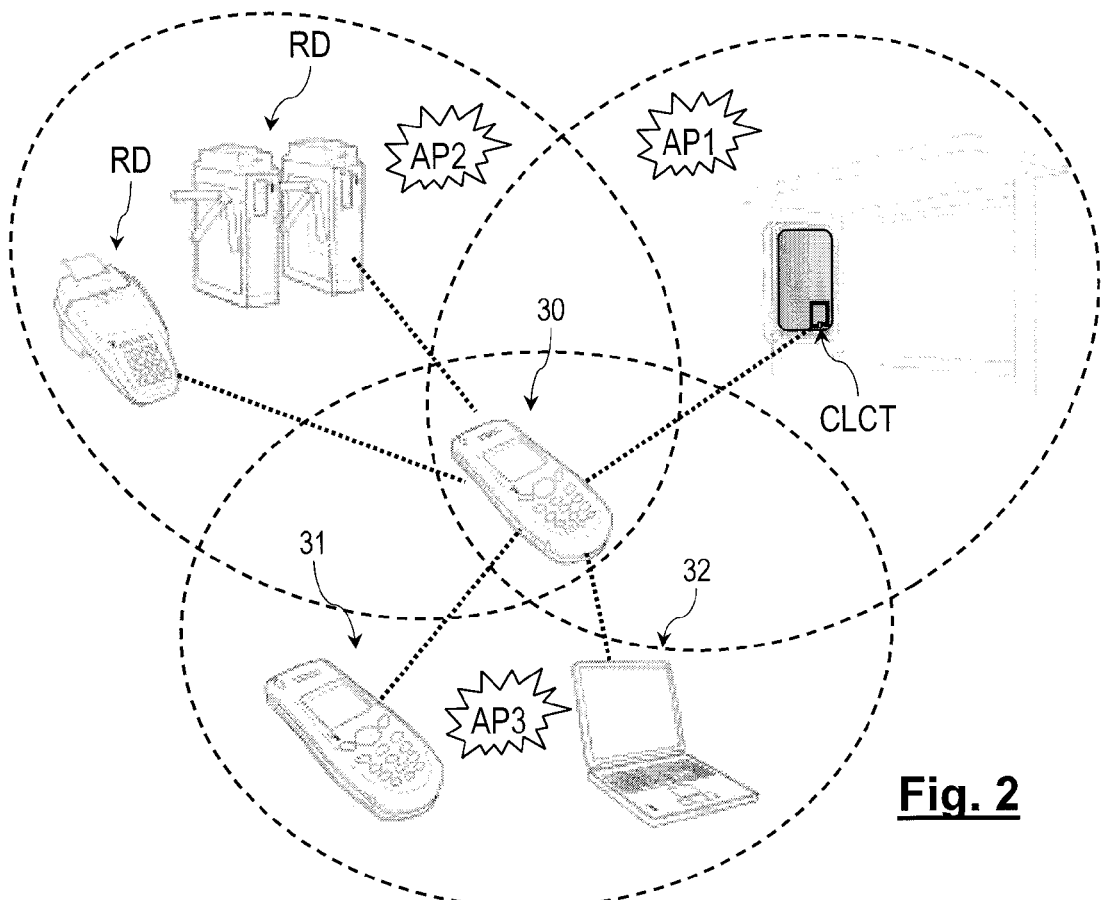
FIG. 2 described above shows various applications of an NFC chipset integrated into a mobile telephone.
Figure 3:
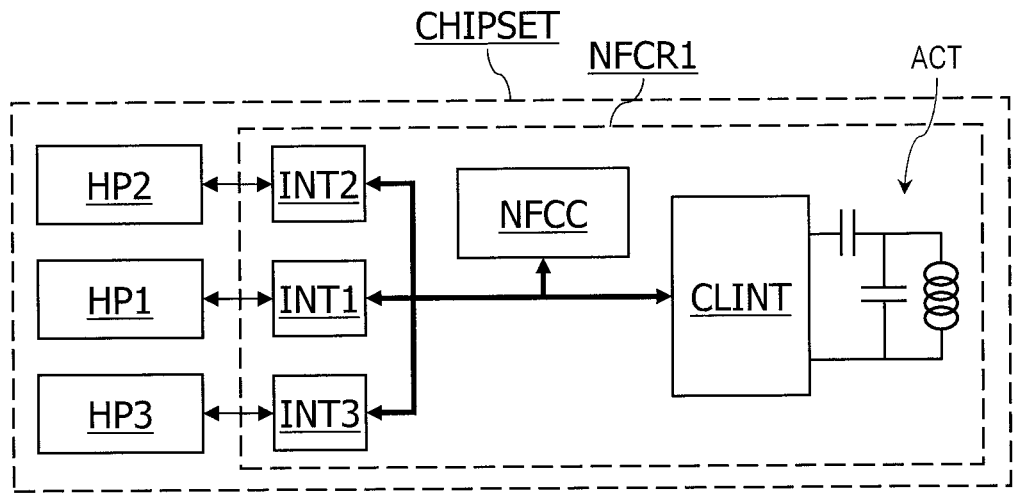
FIG. 3 described above represents in block form the classic architecture of an NFC component present in the NFC chipset in FIG. 1.
Figure 4:
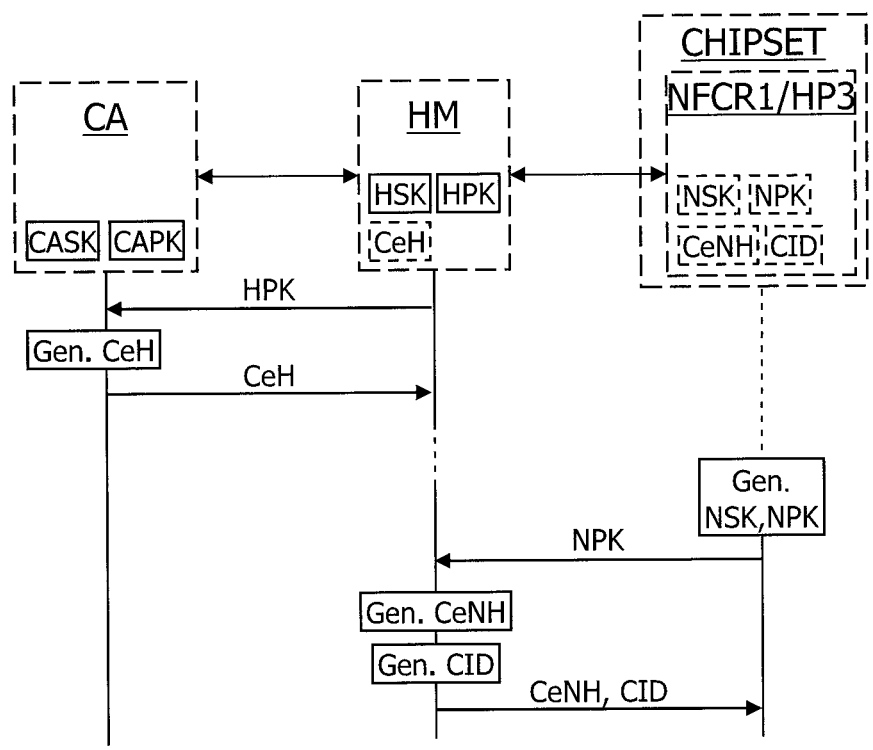
FIG. 4 represents a sequence of customizing an NFC chipset performed by an NFC chipset manufacturer on a chipset.
Figure 5:
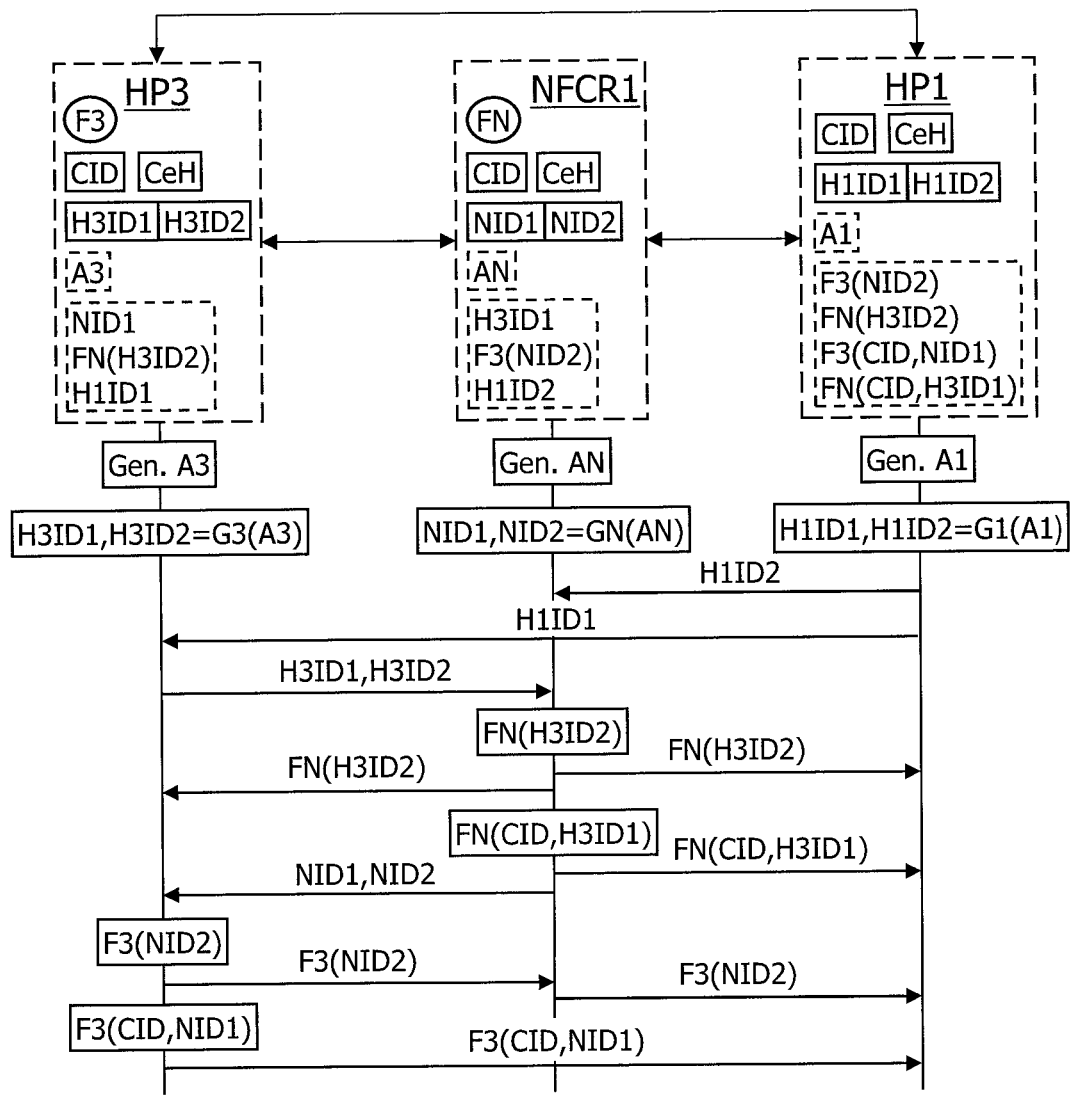
FIG. 5 represents a sequence of pairing the components of the NFC chipset with one another.

FIG. 4 represents a sequence of customizing an NFC chipset as represented in FIG. 3. The customizing sequence involves the NFC chipset, the manufacturer of the chipset HM and a trusted certificate authority CA. The NFC chipset comprises a non-secured host processor HP1, and at least one secured host processor HP3 and a controller NFCC or only the controller NFCC if the latter is secured.

The manufacturer HM has a pair of public HPK and private HSK keys. The authority CA also has a pair of public CAPK and private CASK keys. Communications between the authority CA and the manufacturer HM on the one hand and between the manufacturer and the chipset on the other hand are performed by any appropriate means. The communication between the chipset and the manufacturer HM may be contactless through the component NFCR1 or be established by means of a hard-wired link for example by a test interface.

The customization sequence comprises a prior phase of obtaining a certificate, and an actual customization phase. The phase of obtaining a certificate involves the manufacturer HM requesting a certificate from the trusted certificate authority CA. During a first step, the manufacturer HM transmits to the authority CA its public key HPK and information enabling it to be identified in a sure manner. In a next step, the authority CA checks the manufacturer identification information received, and if it is correct, generates (Gen. CeH) a certificate CeH from the public key HPK. In the next step, the authority CA transmits the certificate CeH to the manufacturer HM.

The phase of customizing the NFC chipset comprises a first step (Gen. NSK,PSK) of a secured component of the chipset, here the processor HP3, generating a pair of public NPK and private NSK keys. In the next step, the secured host processor HP3 sends the public key NPK it has generated to the manufacturer HM. In the next steps, the manufacturer HM generates (Gen. CeNH) a certificate CeNH, for example by ciphering the public key NPK using its private key HSK, and generates (Gen. CID) an identifier CID of the chipset, and sends these elements, possibly with other data, to the secured processor HP3. The certificate CeNH and the identifier CID are then stored by the secured processor HP3.

The chipset may be a mobile telephone. In this case, the identifier CID corresponds to the unique IMEI (International Mobile Equipment Identity) number which is allocated to each mobile telephone.

It shall be noted that the keys NPK, NSK of the chipset may be written in the secured processor HP3 of the chipset when it is manufactured, instead of being generated dynamically by the secured component. Furthermore, the trusted certificate authority CA may be an operator (for example a mobile telephony operator) if all the chipset manufacturers send their public keys to the operator.

If the component NFR1 is not secured and distinct from the host processor HP3, the non-detachable processors HP1, HP3 and the component NFCR1 of the chipset can execute a pairing sequence so as to prevent any of these components from being fraudulently replaced with a non-secured component. This sequence is only executed once during the test of the chipset by the chipset manufacturer.

During the first steps of the sequence, the processors HP1, HP3 and the component NFCR1 generate in parallel a random number A1, A3, AN, and from this random number, two parts of an identification key, i.e. H1ID1 and H1ID2 for the processor HP1, H3ID1 and H3ID2 for the processor HP3, and NID1 and NID2 for the component NFCR1. The generation of each identification key from a random number can be performed for example using an encryption function such as RSA or DES applied to the random number, by extracting a word of a certain number of bits from the result obtained, for example 1,024 bits, and by dividing the word into two parts (each of 512 bits in the example above).

In the next steps, the host processor HP1 transmits the first part H1ID1 of its key to the secured host processor HP3, and the second part H1ID2 to the component NFCR1. In the next steps, the processor HP3 transmits the two parts H3ID1, H3ID2 of its key to the component NFCR1. In the next steps, the component NFCR1 applies an encryption function FN to the second part N3ID2 of the key received and transmits the result FN(N3ID2) to the processors HP1 and HP3. In the next step, the component NFCR1 applies the encryption function FN to the first part H3ID1 of the key received and to the identifier CID of the chipset. In the next step, the value FN(CID, H3ID1) obtained is transmitted to the processor HP1. In the next step, the component NFCR1 in turn transmits the two parts NID1, NID2 of its key to the host processor HP3. In the next steps, the host processor HP3 applies an encryption function F3 to the second part NID2 of the key received and transmits the result F3(NID2) to the component NFCR1 and to the processor HP1. In the next steps, the processor HP3 applies the encryption function F3 to the first part NID1 of the key received and to the identifier of the chipset CID and transmits the result F3(CID, NID1) to the processor HP1.

At the end of this pairing sequence, the host processor HP1 which is not secured stores the following values: F3(NID2), FN(H3ID2), F3(CID,NID1) and FN(CID,H3ID1); the secured host processor HP3 stores the following values: NID1, FN(H3ID2) and H1ID1, and the component NFCR1 stores the following values: H3ID1, F3(NID2) and H1ID2.

Thus, all the keys of the three entities, i.e. of the two host processors HP1, HP3 and of the component NFCR1 are divided and shared between these three entities. If during use of the chipset or during data transmissions between these three entities, the values stored are transmitted to the other entities, each entity can check that the data received indeed come from one of the entities with which it is paired during the manufacturing of the chipset. Thus, if the host processor HP1 transmits the value F3(CID,NID1) to the host processor HP3, the processor HP3 can check this value by applying the encryption function F3 to the values NID1 and CID it stores. Similarly, if the processor HP1 transmits the value FN(CID, H3ID1) to the component NFCR1, the component NFCR1 can check this value by applying the function FN to the values CID and H3ID1 it stores. Reciprocally, if the component NFCR1 sends the value H3ID2 to the processor HP3, the processor HP3 can compare this value with the one it stores. If the value received by an entity does not correspond to a stored value, the receiving entity can decide not to communicate with the sending entity.

It shall be noted that the pairing sequence may be executed as required solely between the host processor HP3 and the component NFCR1 or solely between the processor HP1 and the component NFCR1 if the latter is secured. In this case, it is sufficient to remove the steps which relate to the third component from the sequence.

Figure 6:
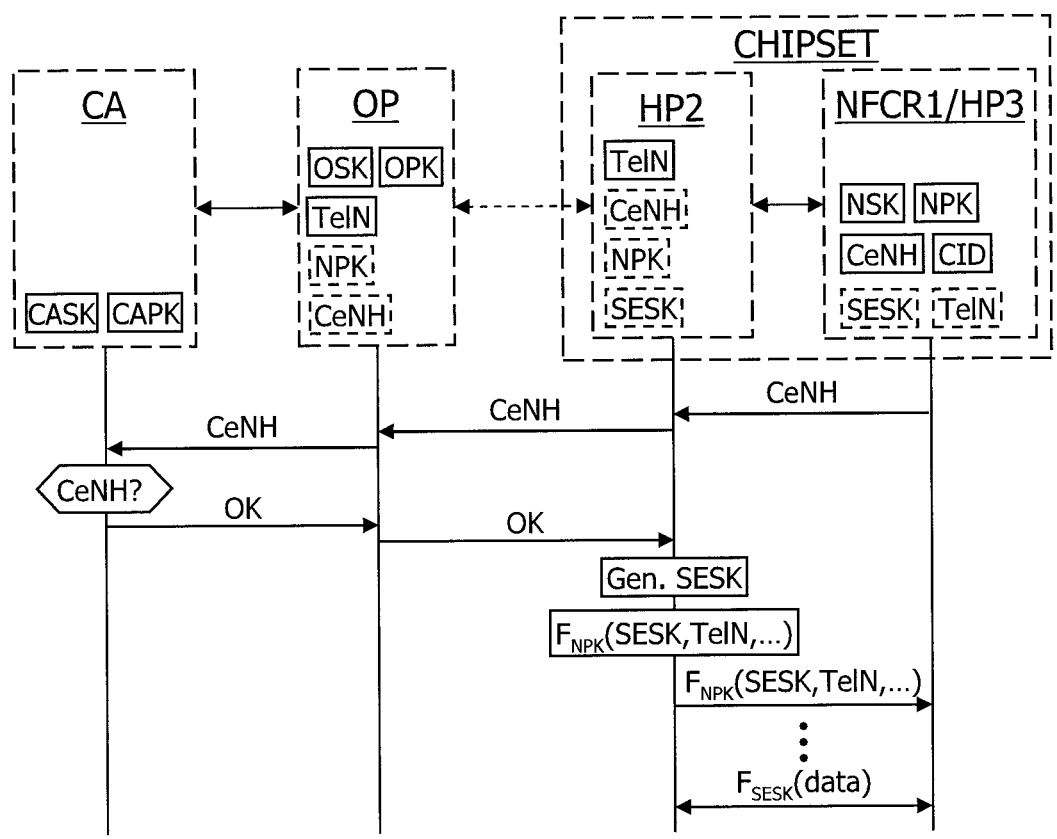
FIG. 6 represents a sequence of establishing a secured communication link between an NFC component and a secured host processor of the NFC chipset.

FIG. 6 represents a sequence of establishing a secured link between the secured processor HP3 customized by the manufacturer and another secured host processor HP2 of the chipset. The sequence of establishing a secured link involves the NFC chipset, an operator OP and the trusted certificate authority CA. The operator OP has a pair of public OPK and private OSK keys. Communications between the authority CA and the operator OP on the one hand and between the operator and the chipset on the other hand are performed by any appropriate means. The communication link between the host processor HP2 and the operator OP is secured, i.e. the data exchanged are ciphered before being transmitted, the secured host processor HP2 being supplied by the operator OP to the user of the chipset. The communication between the processors HP2 and HP3 is established through the component NFCR1 and in particular the controller NFCC.

In the event that the chipset is a mobile telephone, the operator OP is a mobile telephony operator and the host processor HP2 is the SIM card which is installed in the mobile telephone. The host processor HP2 then shares an encryption key, the telephone number TelN and other parameters of the mobile telephone with the operator.

In the first step of the sequence of establishing a secured link, the secured processor HP3 transmits the certificate CeNH (containing the public key NPK) to the host processor HP2. In the next step, the host processor HP2 transmits the information received to the operator OP in a ciphered manner. In the next step, the operator OP transmits the certificate received CeNH to the authority CA for checking. In the next step (CeNH?), the authority CA checks the certificate received thanks to the public key HPK of the manufacturer of the chipset recorded when the certificate CeH was generated (step "Gen. CeH" in FIG. 4).

If the certificate received is valid, the authority CA transmits a validation message (OK) to the operator OP. In the next step, the operator OP retransmits the validation message to the host processor HP2. Therefore, the host processor HP2 and the operator check that the NFC chipset to which the host processor is connected is valid. If this is the case, the host processor HP2 can establish a secured communication with the chipset. In the next steps, the host processor HP2 generates (Gen. SESK) a session key SESK and ciphers the session key with other customization information, if any, such as the telephone number TelN, using an encryption function FNPK using the public key NPK of the secured processor HP3. The session key SESK is for example generated using a function of generating random numbers. In the next step, the processor HP2 transmits the result of the ciphering to the secured processor HP3. In the next step, the secured processor HP3 deciphers the information received using the private key NSK and thus obtains the session key SESK and the other information TelN thus transmitted in a secured manner. The secured processor HP3 and the processor HP2 can then exchange information in a secured manner by first ciphering the information to be transmitted using an encryption function $F_{SESK}$ using the session key SESK shared only by the secured processors HP2 and HP3.

It shall be noted that the session key SESK may be generated and ciphered by the operator OP. In this case, the presence of the host processor HP2 is not necessary in this sequence. It is merely important for a secured link to be established between the chipset and the operator. Thus, the sequence of establishing a secured link may also apply to mobile telephones without SIM card such as CDMA-type (Code Division Multiple Access) telephones.

Figure 7:
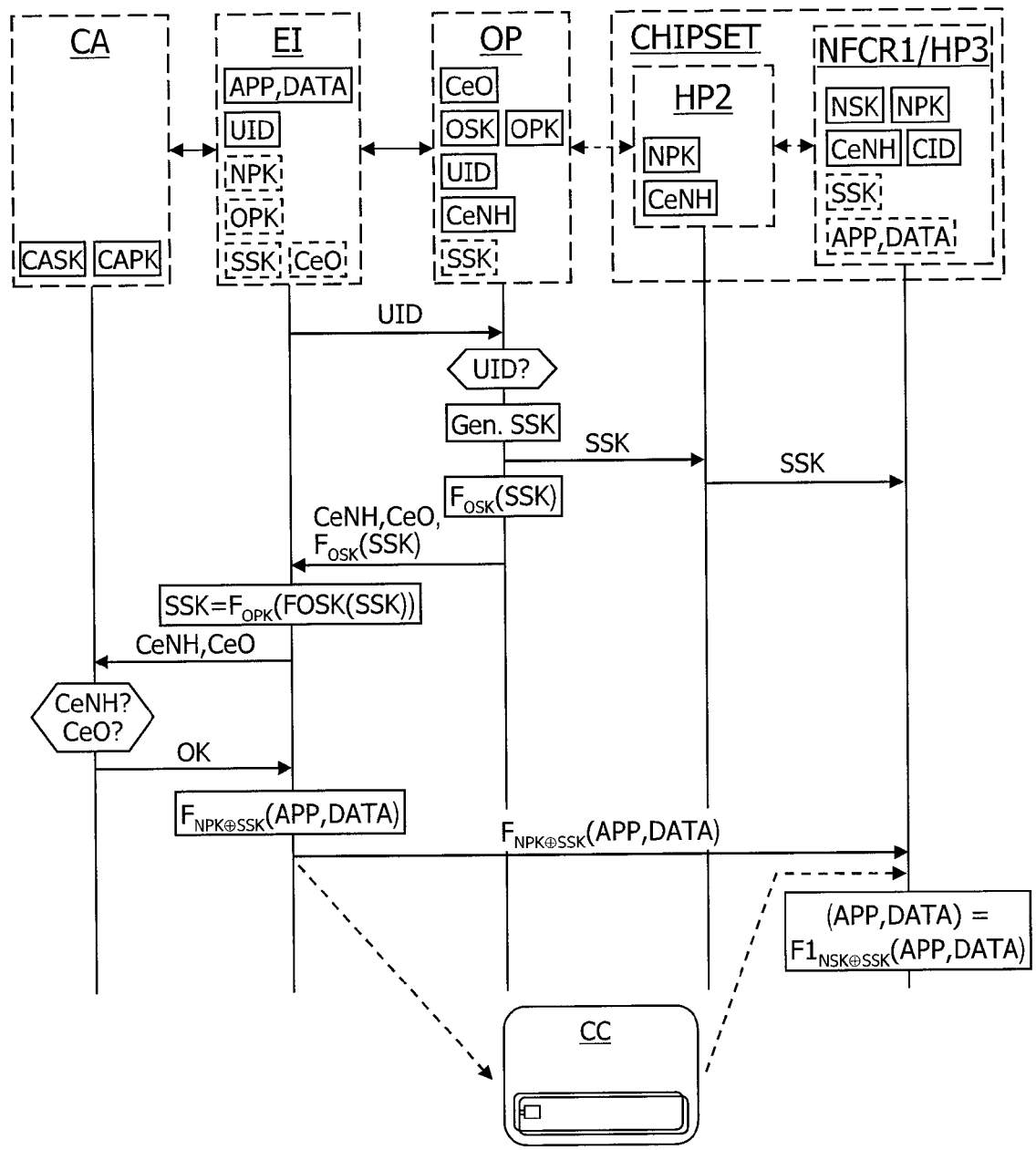
FIG. 7 represents a sequence of securely downloading data between an external entity and a secured host processor of the NFC chipset.

FIG. 7 represents a sequence of securely downloading data DATA, and more particularly an application program APP, between an external entity EI and the secured processor HP3 of the NFC chipset, through the component NFCR1 and a contactless link established by the component NFCR1. The data and/or the application program enable a service to be accessed or carried out, for example a payment or transport service provided by the external entity EI.

For more clarity, the word "data" will be used to designate data and/or one or more application programs in the rest of the description and in the claims.

The downloading sequence involves the NFC chipset, the operator OP, the trusted certificate authority CA and the entity EI supplying the data and/or the application program to be downloaded. The operator OP has a pair of public OPK and private OSK keys. Communications between the authority CA, the entity EI and the operator OP are performed by any appropriate means. The communication link between the host processor HP2 and the operator OP is secured, i.e. the data exchanged are ciphered before being transmitted, the secured host processor HP2 being supplied by the operator OP to the user of the chipset. The communication link between the processor HP2 and the secured processor HP3 is also secured, for example using the sequence described above with reference to FIG. 6. The communication link between the processors HP2 and HP3 can also be secured by ciphering using, for each data transmission, both the private key of the sending processor and the public key of the receiving processor. Thus, only the receiving processor can decipher the data transmitted and it is certain that the latter are sent by the processor that is supposed to send it the data.

During a first step, the entity EI transmits to the operator OP for checking, information UID identifying the user of the chipset who wishes to download the information DATA, APP on its NFC chipset. In the next step (UID?), the operator OP searches for information relating to routing data towards the chipset, according to the information UID. If the identification information UID correspond to a referenced user, the operator generates (Gen. SSK) a session key SSK. The session key is for example generated using a function of generating random numbers. In the next steps, the session key SSK is transmitted in a secured manner from the operator OP to the secured processor HP3, through the processor HP2, using the routing information corresponding to the identification information UID.

In parallel, the session key SSK is ciphered by the operator OP using an encryption function FOSK using the secret key OSK, then transmitted to the entity E1 with the certificate of the chipset CeNH and the certificate of the operator CeO. The ciphering of the session key SSK by a secret key corresponds to the generation of an electronic signature, given that the reverse deciphering operation can be performed by anyone since the corresponding deciphering key is the public key OPK of the operator.

In the next steps, the entity EI deciphers the session key SSK using an encryption function $F_{OPK}$ using the public key OPK of the operator OP, and extracts from the certificates CeNH and CeO the public keys NPK and OPK of the host processor HP3 and of the operator OP, using the public key CAPK of the authority CA. The entity EI then transmits the certificates CeH and CeO received for checking to the trusted certificate authority CA. In the next steps (CeNH?, CeO?), the authority CA checks the certificates CeH and CeO and if they are valid, transmits a validation message OK to the entity EI. In the next steps, the entity E1 ciphers the data DATA and/or the application program APP to be downloaded using an encryption function $F_{NPK \oplus SSK}$ using the public key NPK of the secured processor HP3 and the session key SSK, and transmits the result of the ciphering to the secured processor HP3. The ciphering applied can be a double ciphering using the public key NPK and the session key SSK as successive ciphering keys, or a single ciphering using a combination of the two keys NPK and SSK as encryption key, obtained for example using the exclusive OR function applied to the two keys NPK, SSK. The result of the ciphering is then transmitted by the entity EI to the secured processor HP3 which deciphers the information received using an encryption function $F1_{NSK \oplus SSK}$ using the session key SSK and the private key NSK of the processor HP3. Thus, the data DATA and/or the application program APP have been downloaded in a secured manner into the processor HP3, without the operator OP being able to decipher the information transmitted as it does not have the private key NSK.

It shall be noted that the sequence in FIG. 7 may be executed without involving the host processor HP2.

The application program APP and/or the ciphered data may be downloaded through the operator OP, then the host processor HP1, if the operator is a mobile telephony operator and if the processor HP1 is the baseband circuit of a mobile telephone. The downloading may alternatively be performed using an integrated circuit card CC, preferably with contactless reading, such as a bank card into which the entity EI has loaded the application program APP and/or the ciphered data, and the session key SSK and the public key of the processor HP3. The card CC is then given to the user of the chipset who places it near the chipset so as to establish a contactless communication between the card and the chipset which then works in reader mode, and to perform the desired downloading.

The card CC may also be used to authenticate, validate or activate an application loaded into the host processor HP3. Thus, it may for example be used to activate a payment threshold.

Figure 8:
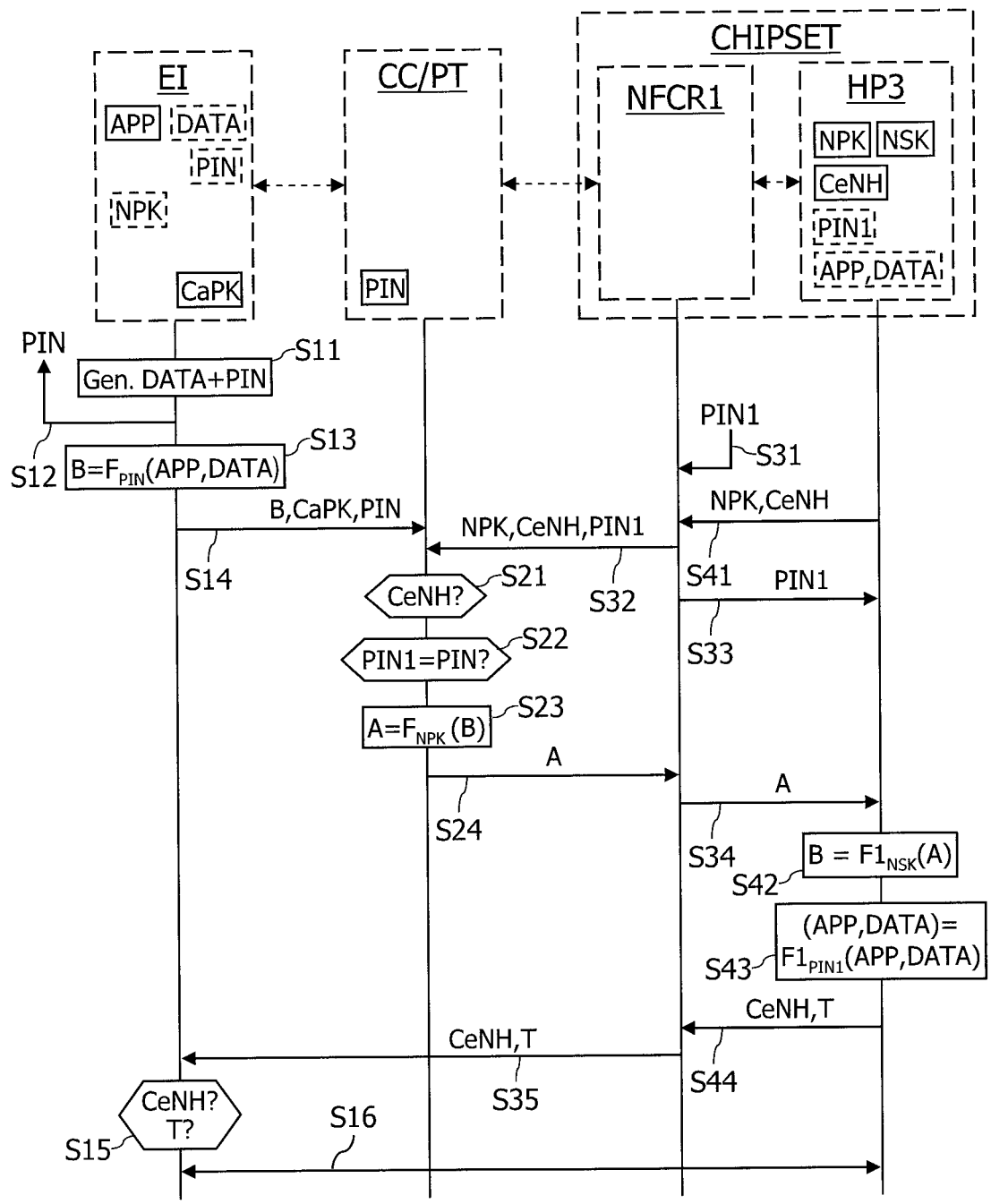
FIG. 8 illustrates an alternative of the downloading sequence represented in FIG. 7.

FIG. 8 represents another sequence of securely downloading customized data DATA, and possibly an application program APP, between an external entity EI and the secured processor HP3 of the chipset NFC, through the component NFCR1 and a contactless link established by the component NFCR1. The data and/or the application program enable a service to be accessed or carried out, for example a payment or transport service provided by the external entity.

The downloading sequence involves the chipset NFC, the entity EI (a server of the entity EI) supplying the customized data DATA and possibly the application program APP to be downloaded, and an intermediary transmission relay such as the integrated circuit card CC which may be with contactless reading, or a terminal PT in communication with the entity EI. Communications between the card CC or the terminal PT and the chipset NFC are performed through a contactless link. Communications between the card CC and the entity EI can also be performed through a contactless link. Communications between the terminal PT and the entity EI can be performed by any appropriate means such as a data transmission network.

In the sequence represented in FIG. 8, the entity EI first of all executes steps S11 to S14.

In the event that the relay CC/PT is a terminal, the user must first identify itself to the terminal. The identification of a user triggers the execution of steps S11 to S14.

In step S11, the entity EI generates customized data DATA specific to a user for an application APP, including a code PIN. In step S12, the entity EI supplies the code PIN to the user by any appropriate means guaranteeing a certain level of security, such as transmission by mail. In step S13, the entity EI ciphers the customized data DATA and the application APP using the code PIN as an encryption key. In step S14, the ciphered data B are supplied to the transmission relay CC/PT together with a public key CaPK from a certificate authority, and the code PIN. In the event that the transmission relay is the card CC, the card is given to the user.

Moreover, in a step S31, a code PIN1 is introduced into the system NFC by the user, said code being supplied to the component NFCR1. In a step S41, the host processor HP3 transmits its public key NPK and the associated certificate CeNH to the component NFCR1. In a step S32, the component NFCR1 transmits the code PIN1, the public key NPK and the certificate CeNH to the transmission relay CC/PT. In step S33, the component NFCR1 transmits the code PIN1 to the host processor HP3 again.

Upon receiving the data PIN1, NPK, CeNH from the component NFCR1 and the data B, CaPK from the entity EI, the transmission relay CC/PT executes steps S21 to S24. In steps S21 and S22, the relay CC/PT checks the certificate CeNH by means of the public key CaPK and checks that the code PIN it has received from the entity EI corresponds to the code PIN1 received from the component NFCR1. If these checks reveal an error, the execution of the sequence is not continued. In the opposite case, the transmission relay CC/PT ciphers the ciphered data B in step S23, to obtain ciphered data A. In step S24, the ciphered data A are transmitted to the component NFCR1. In step S34, the component NFCR1 transmits the ciphered data A to the host processor HP3 again. The processor HP3 then executes the steps S42 to S44. In step S42, the processor HP3 deciphers the data A using the key NSK corresponding to the public key NPK, to obtain the ciphered data B. In step S43, the processor HP3 deciphers the data B by means of the code PIN1 (corresponding to the code PIN), to obtain the application APP and the data DATA. In step S45, the processor HP3 executes the application APP, which triggers the sending of the certificate CeNH and of the customized transaction data T to the component NFCR1. In step S35, the component NFCR1 transmits the data received (CeNH, T) to the entity EI again. This transmission can be performed by means of a terminal, such as the terminal PT, in communication with the entity E1 and having means for establishing a contactless link with the component NFCR1. In step S15, the entity EI checks the certificate CeNH and the transaction data T and if these data (CeNH, T) are correct, it validates the execution of the application APP in step S16.

It shall also be noted that the step of deciphering S13 may be omitted, the data DATA and the application APP thus being supplied directly to the transmission relay CC/PT. In that case, the step S43 must also be omitted, and an introduction of the code PIN by the user to activate the application can be provided, the entity EI checking the code supplied by the user before authorizing the activation of the application.

The relay CC/PT may also be omitted. In that case, the entity EI communicates directly with the chipset NFC, for example through a mobile telephone link, if the chipset is a telephone or a mobile terminal. The steps S21 to S24 are then executed by the entity E1, and the step S14 is not necessary.

Furthermore, the application APP can be transmitted to the host processor HP3 by other means, not necessarily secured ones, if the application is to be associated with customized data DATA specific to a user in order to be able to be executed, the data DATA moreover being transmitted through a secured channel.

Figure 9:
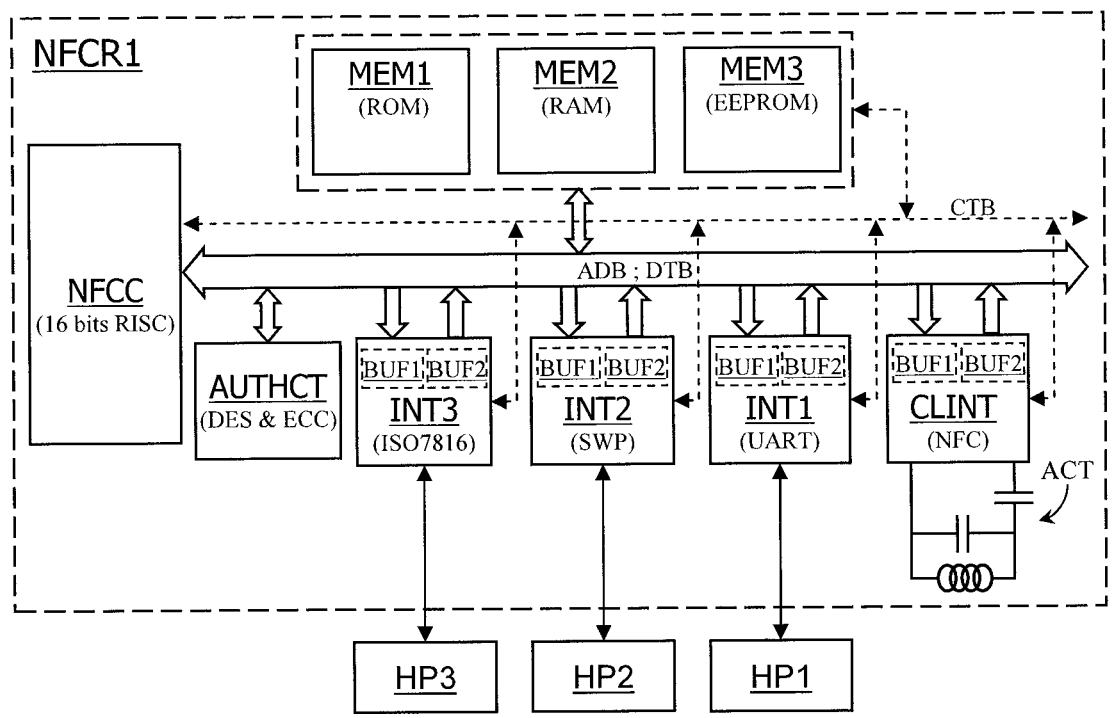
FIG. 9 represents an example of hardware architecture of an NFC component present in the NFC chipset.

FIG. 9 represents an example of hardware architecture of the component NFCR1 used to implement the sequences in FIGS. 5, 6, 7 and 8. The component NFCR1 comprises:
- the controller NFCC and the interface CLINT already described,
- a memory array comprising a program memory MEM1 of ROM type (read-only memory), a data memory MEM2 of RAM type (random access memory), and an EEPROM-type electrically erasable and programmable memory MEM3 enabling the secret data K2 and the session key SK to be recorded,
- an authentication and error correction circuit AUTHCT comprising DES (Data Encryption Standard) and ECC (Elliptic Curve Cryptography) algorithms, or other encryption algorithms,
- a connection port INT1 of UART (Universal Asynchronous Receiving Transmitting) type, to which the host processor HP1 is here connected,
- a connection port INT2 of SWP type (Single Wire Protocol) to which the host processor HP2 is here connected (the processor HP2 here being assumed to be a SIM card),
- a connection port INT3, for example of ISO7816 type enabling the host processor HP3 to be connected,
- a data bus DTB and an address bus ADB linking the memory array, the controller NFCC, the interface CLINT and the ports INT1, INT2, INT3, and
- a control bus CTB enabling the controller NFCC to read- and/or write-control and access these various elements.

The interface CLINT and the ports INT1, INT2, INT3 each have an input buffer BUF1 with parallel input and an output buffer BUF2 with parallel output that is write-accessible, and respectively read-accessible, via the data bus and the address bus. The exchange of data forming the routing commands or the data frames between the host processors HP1, HP2, HP3 and the controller NFCC or the interface CLINT is thus performed by data blocks of the size of the buffers BUF1, BUF2, and is paced by the controller NFCC.

The present invention is not limited either to a chipset comprising an NFC component. Other means of communication may be provided such as wireless communication means like Bluetooth, Wifi, UWB (Ultra Wide Band) or an infrared link, or even hard-wired communication means complying for example with the USB standard.

Furthermore, the entity supplying the data to be downloaded may be the same as the operator implementing the secured communication with the host processor HP2, such that the entity that supplies the data to be downloaded APP, DATA is the one which also supplies the encryption key SSK of the data to the host processor HP3.

The present invention also covers the loading of data and application programs into a system having a single host processor and which can execute several applications.

We claim:

1. A method for securely loading data into a secured host processor of an NFC system, the method comprising:
   generating a first session key,
   receiving a user identifier from the user of an NFC system for receiving the first session key, the NFC system comprising an NFC interface circuit for sending and receiving data,
   transmitting the first session key to a first host processor of the NFC system, for storage therein as a second session key, through a first communication link established as a function of the user identifier, wherein transmission through the first communication link is according to a routing information corresponding to the user identifier,
   ciphering data to be loaded into the first host processor using a public key of the first host processor and the first session key, the public key and the first session key being combined as a single encryption key for ciphering the data to be loaded into the first host processor,
   transmitting the ciphered data to the first host processor through a second communication link wherein a contactless-reading integrated circuit card communicates with the NFC interface circuit, and
   deciphering the ciphered data using a private key corresponding to the public key of the first host processor and the second session key stored in the first host processor, the deciphering of the ciphered data being performed only if the second session key stored in the host processor corresponds to the first session key used to cipher the data.

2. The method according to claim 1, comprising authenticating the NFC system and an operator generating the first session key.

3. The method according to claim 2, wherein the authentication of the NFC system and of the operator is performed by a service provider supplying the data to be loaded into the first host processor, by checking certificates with a trusted certificate authority.

4. The method according to claim 1, wherein the first session key is transmitted in signed form by an operator having generated the first session key, and the signature is checked by a service provider supplying the data to be loaded into the first host processor.

5. The method according to claim 1, wherein the first communication link is established in a secured manner through a second secured host processor of the NFC system.

6. The method according to claim 1, wherein the first session key is generated by a second secured host processor of the NFC system.

7. The method according to claim 1, comprising receiving by the first host processor a certificate of authenticity, a secured communication link being established with an operator after the certificate of authenticity has been checked and only if the certificate is valid.

8. The method according to claim 1, comprising steps of exchanging secret data between a controller connected to the NFC interface circuit, the first host processor and a third non-secured host processor of the NFC system, a communication link between the controller, and the first and third host processors being established only after the secret data have been checked and only if the checking reveals no errors.

9. The method according to claim 1, comprising initial steps of transmitting to the first host processor a unique identifier associated with a certificate of authenticity, which are stored by the first host processor.

10. The method according to claim 1, comprising checking that the second session key stored in the first host processor corresponds to the first session key, the ciphered data not being transmitted if the checking reveals an error.

11. A service providing system comprising:
an entity providing a service,
several NFC systems each comprising a first host processor connected to an NFC interface circuit for sending and receiving data, wherein:
the entity is configured to generate a first session key, receive a user identifier from the user of one of the NFC systems for receiving the first session key, and cipher data to be loaded into the first host processor of the selected NFC system using a public key of the first host processor and the first session key, the public key and the first session key being combined as a single encryption key for ciphering the data to be loaded into the first host processor,
the service providing system is configured to transmit the first session key to the first host processor of the select NFC system, for storage therein as a second session key, through a first communication link established as a function of the user identifier, wherein transmission through the first communication link is according to a routing information corresponding to the user identifier, and transmit the ciphered data to the first host processor of the selected NFC system through a second communication link wherein a contactless-reading integrated circuit card communicates with the NFC interface circuit,
the first host processor of each NFC system is configured to decipher ciphered data received through the second communication link using a private key corresponding to the public key of the first host processor and the second session key, if the second session key stored in the first host processor corresponds to the first session key used to cipher the data.

12. The service providing system according to claim 11, comprising a service provider configured to supply data to be loaded into the first host processor of the NFC systems and to authenticate the selected NFC system and an operator generating the first session key.

13. The service providing system according to claim 11, wherein the first communication link is established in a secured manner through a second secured host processor of the selected NFC system.

14. The service providing system according to claim 11, wherein the first session key is generated by a second secured host processor of the selected NFC system.

15. The service providing system according to claim 11, wherein the first host processor of each of the NFC systems is configured to receive a certificate of authenticity, and to establish a secured communication link with an operator after the certificate of authenticity has been checked and only if the certificate is valid.

16. The service providing system according to claim 11, wherein each of the NFC systems comprises a controller connected to the NFC interface circuit, the first host processor, the controller and a third non-secured host processor of each of the NFC systems being configured to exchange secret data, a communication link between the controller, the first and the third host processor being established only after the secret data have been checked and only if the checking reveals no errors.

17. The service providing system according to claim 11, wherein the first host processor of each of the NFC systems is configured to receive and store during a customization phase a unique identifier of the NFC system associated with a certificate of authenticity.

18. The service providing system according to claim 11, wherein the service providing system is further configured to check that the second session key stored in the first host processor corresponds to the first session key, the ciphered data not being transmitted if the checking reveals an error.

* * * * *